United States Patent [19]
Suehiro et al.

[11] Patent Number: 5,324,771
[45] Date of Patent: Jun. 28, 1994

[54] POLYPROPYLENE RESIN COMPOSITIONS, COATING PROCESS FOR MOLDINGS THEREOF AND ITS COATED MOLDINGS

[75] Inventors: Keigo Suehiro; Katsuyuki Nitta; Katsumi Sekiguchi; Takeaki Inokuma; Chihiro Ogawa, all of Kanagawa; Osamu Aoki, Tochigi; Kenji Hamabe, Tochigi; Atsushi Takeuchi, Tochigi, all of Japan

[73] Assignees: Mitsui Toatsu Chemicals, Inc.; Honda Giken Kogyo Kabushi Kaisha, Tokyo, Japan

[21] Appl. No.: 875,017

[22] Filed: Apr. 28, 1992

[30] Foreign Application Priority Data

Apr. 30, 1991 [JP] Japan .................. 3-098658

[51] Int. Cl.$^5$ .............................. C08L 23/26
[52] U.S. Cl. ............................ 524/525; 524/267; 524/523; 524/528; 525/232
[58] Field of Search ............ 524/525, 523, 528, 267; 525/232

[56] References Cited

U.S. PATENT DOCUMENTS

| | | | |
|---|---|---|---|
| 4,748,212 | 5/1988 | Murachi et al. | 525/332.8 |
| 4,845,145 | 7/1989 | Hazelton et al. | 524/523 |
| 4,849,468 | 7/1989 | Murachi et al. | 524/523 |
| 5,196,270 | 3/1993 | Kitagawa et al. | 524/525 |

FOREIGN PATENT DOCUMENTS

| | | |
|---|---|---|
| 3-157168 | 7/1991 | Japan . |
| 3-277636 | 12/1991 | Japan . |
| 4-77567 | 3/1992 | Japan . |
| 4-93330 | 3/1992 | Japan . |

*Primary Examiner*—Paul R. Michl
*Assistant Examiner*—Olga Asinovsky
*Attorney, Agent, or Firm*—Burns, Doane, Swecker & Mathis

[57] ABSTRACT

A coated molded article having good adhesion to a coating film and resistance to gasohol as well as excellent appearance can be obtained by applying a primer coating to the surface of a molded article or irradiating the surface with plasma without applying any washing-treatment with a halogen atom-containing organic solvent and then applying a top coat onto the article, if the molded article is formed from a resin composition comprising (A) a polypropylene; (B) a specific ethylene-propylene-diene terpolymer rubber; (C) a specific ethylene-propylene copolymer rubber; and (D) a specific polyhydroxypolyolefin, the amounts of these components (A) to (D) satisfying the following relations:

$$10 \leq [(B)+(C)]/[(A)+(B)+(C)] \leq 60 \ (\% \text{ by weight})$$

$$1 \leq (C)/[(B)+(C)] \leq 50 \ (\% \text{ by weight})$$

$$0.5 \leq (D)/[(A)+(B)+(C)+(D)] \leq 10 \ (\% \text{ by weight})$$

6 Claims, No Drawings

POLYPROPYLENE RESIN COMPOSITIONS, COATING PROCESS FOR MOLDINGS THEREOF AND ITS COATED MOLDINGS

BACKGROUND OF THE INVENTION

1. Field of the Invention

The present invention relates to a polypropylene resin composition excellent in coating properties and more particularly to an impact-resistant polypropylene resin composition preferably used in the production of exterior equipment for automobiles such as bumpers, a method for coating a molded article formed from the polypropylene resin composition, in particular, exterior equipment for automobiles such as bumpers, and the coated molded article.

2. Description of the Prior Art

Polypropylene resins have a wide variety of applications because of low density, high rigidity, high heat resistance and high resistance to chemicals. However, it is known that the polypropylene resins are essentially non-polar and accordingly, inferior in coating properties. For instance, when polypropylene bumpers for automobiles are coated, it is necessary to pre-treat the article with a halogen atom-containing organic solvent such as 1,1,1-trichloroethane and then apply an under coat of a primer thereto, or to subject it to plasma-irradiation, prior to the application of a top coat in order to ensure sufficient adhesive strength of the coated film.

However, the conventional methods as described above require a large number of steps and it takes a long time for practicing these steps. Moreover, it has been feared that the halogen atom-containing organic solvents used in the pre-treatment may adversely affect the human body and environments and accordingly a countermeasure therefore must be urgently considered. For this reason, there has been required the improvement of the coating method conventionally employed while also taking into consideration time and expenses required for the treatments of waste liquor generated.

There have been proposed methods for improving the coating properties of molded articles formed from compositions mainly comprising polypropylene resins and elastomers which comprise adding, to the composition, a diene polymer having terminal hydroxyl groups or a hydrogenated product thereof [see, for instance, Japanese Unexamined Patent Publication (hereinafter referred to as "J.P. KOKAI") Nos. Hei 3-157168, Hei 4-77567, Hei 4-93330 and Hei 3-277636]. The purpose of these methods is to apply a coating without application of any primer coating and/or plasma-irradiation. However, when an article to be coated is not degreased and washed with 1,1,1-trichloroethane, various problems arise in more severe evaluation of coating properties of the resulting coated article. For instance, the coating film is insufficient in resistance to solvent and the coated film near gate portions is peeled off in the X-shaped cross hatch mark test.

The so-called X-shaped cross hatch mark test has been practiced as a means for evaluating the adhesion of a coated film. There have been known the normal cross hatch mark test and more strict X-shaped cross hatch mark test. The normal cross hatch mark test comprises making cuts on the coated film so that two sets of parallel lines which are perpendicular (90°) to one another are formed. On the other hand, the X-shaped cross hatch mark test comprises making cuts on the coated film so that two sets of parallel lines cross one another in the X-shaped form, i.e., at an angle of 45°. In case of the conventional coated articles which are pre-treated with 1,1,1-trichloroethane, adequate results are obtained in the X-shaped cross hatch mark test. On the other hand, in the case of those which are not pre-treated with the organic solvent, adequate results are obtained in the normal cross hatch mark test, but insufficient results are often obtained in the more strict X-shaped cross hatch mark test. Accordingly, there has been desired to provide coated articles which are not pre-treated with 1,1,1-trichloroethane and can provide good results even in the X-shaped cross hatch mark test.

Moreover, it has been a recent tendency, in North America, South America, Europe or the like to use a so-called gasohol which is a mixture of gasoline for automobiles and lower alcohols such as methanol, ethanol and butanol for the purposes of saving natural resources and reduction of cost. The gasohol exerts severe influence on the peeling properties of coating films as compared with the gasoline per se and, therefore, there has been desired for the improvement of these polypropylene molded article in the resistance to gasohol.

SUMMARY OF THE INVENTION

Accordingly, an object of the present invention is to provide an impact-resistant polypropylene resin composition capable of providing a molded article which does not require the degreasing and washing with any halogen atom-containing organic solvent such as 1,1,1-trichloroethane; which can accept a top coat after direct application of a primer coat or plasma-irradiation; and which have substantially improved adhesion to the coated film, and in particular to provide an impact-resistant polypropylene resin composition which is excellent in coating properties and which can suitably be used for the production of external parts for automobiles such as bumpers.

Another object of the present invention is to provide an improved method for coating a molded article obtained through molding of the foregoing resin composition.

A still another object of the present invention is to provide a molded article obtained by coating a molded article according to the foregoing coating method and in particular to provide an external part for automobiles, which is excellent in adhesion strength and resistance to gasohol.

Under such circumstances, the inventors of this invention have diligently studied and have found that if a molded article is produced from a polypropylene composition which comprises incorporating into polypropylene a specific ethylene-propylene-diene terpolymer rubber, a specific ethylene-propylene copolymer rubber and a specific polyhydroxy polyolefin in a specific compounding ratio, the resulting article does not require any pre-treatment with a halogen atom-containing organic solvent such as 1,1,1-trichloroethane, can accept a top coat after direct application of a primer coat or plasma-irradiation and has substantially improved adhesion to the coated film and excellent appearance. The present invention has thus been completed on the basis of this finding.

According to an aspect of the present invention, there is provided a polypropylene resin composition which comprises (A) a polypropylene; (B) an ethylene-propylene-diene terpolymer rubber having a propylene content ranging from 15 to 50% by weight, a Mooney viscosity $ML_{1+4}$ (100° C.) ranging from 20 to 60, an iodine value ranging from 8 to 25 and a molecular weight distribution, Mw/Mn, ranging from 1.5 to 4.0; (C) an ethylene-propylene copolymer rubber having a propylene content ranging from 15 to 35% by weight and a Mooney viscosity $ML_{1+4}$ (100° C.) ranging from 15 to 25; (D) a polyhydroxy polyolefin having a hydroxyl value (KOH mg/g) of not less than 20; and (E) an inorganic filler, the amounts of these components satisfying the following relations (1) to (4):

$$10 \leq [(B)+(C)]/[(A)+(B)+(C)] \leq 60 \text{ (\% by weight)} \quad (1)$$

$$1 \leq (C)/[(B)+(C)] \leq 50 \text{ (\% by weight)} \quad (2)$$

$$0.5 \leq (D)/[(A)+(B)+(C)+(D)] \leq 10 \text{ (\% by weight)} \quad (3)$$

$$0 \leq (E)/[(A)+(B)+(C)+(D)] \leq 40 \text{ (\% by weight)} \quad (4)$$

According to another aspect of the present invention, there is provided a coating method which comprises the steps of molding the foregoing polypropylene resin composition to give a molded article, applying a primer coat to the surface of the article or irradiating the molded article with plasma without applying any pretreatment with a halogen atom-containing organic solvent, and then applying a top coat onto the article.

According to a further aspect of the present invention, there is provided a coated molded article obtained by coating an article molded from the foregoing polypropylene resin composition according to the foregoing coating method.

DESCRIPTION OF THE PREFERRED EMBODIMENTS

The polypropylene used as Component (A) in the present invention is not restricted to specific ones as long as they are crystalline polypropylenes and specific examples thereof are homopolymer of propylene and random or block copolymers of propylene, ethylene and/or α-olefin. The α-olefin herein means, for instance, butene-1, pentene-1, hexene-1 and 4-methylpentene-1 and these α-olefins may be used alone or in combination of at least two of them.

In the present invention, block copolymers of propylene and ethylene are preferably used as Component (A), with the use of such block. copolymers having ethylene contents of 5 to 25% by weight and melt indexes of 1 to 100 g/10 min (ASTM D- 1238, at 230° C.) being particularly preferred.

The ethylene-propylene-diene terpolymer rubber (hereinafter referred to as "EPDM") used as Component (B) in the invention must have a propylene content ranging from 15 to 50% by weight, a Mooney viscosity $ML_{1+4}$ (100° C.) ranging from 20 to 60, an iodine value ranging from 8 to 25 and a molecular weight distribution, Mw/Mn, ranging from 1.5 to 4.0. The diene component for the foregoing EPDM may be, for instance, ethylidene norbornene, dicyclopentadiene and 1,4-hexadiene.

In the foregoing EPDM, if the propylene content is less than 15% by weight, the adhesion to the coating film subsequently applied is insufficient, while if it exceeds 50% by weight, the yield of EPDM is lowered. In addition, if the Mooney viscosity $ML_{1+4}$ (100° C.) is less than 20, the impact resistance of the resulting resin composition is impaired and if it exceeds 60, the adhesion to the coating film subsequently applied is insufficient. Further, if the iodine value of EPDM is less than 8, the adhesion to the coating film is impaired, while if it exceeds 25, the yield of EPDM is lowered. It is practically difficult to prepare EPDM's having a molecular weight distribution, Mw/Mn, of less than 1.5. On the other hand, if the Mw/Mn exceeds 4.0, the adhesion to the coating film is impaired and the resulting molded article has a bad appearance. The molecular weight distribution is determined by the gel permeation chromatography.

The ethylne-propylene copolymer rubber (hereinafter referred to as "EPM") used as Component (C) in the invention must have a propylene content ranging from 15 to 35% by weight and a Mooney viscosity $ML_{1+4}$ (100° C.) ranging from 15 to 25. If the propylene content is beyond the upper limit, the coating properties of the resulting molded article are not sufficiently improved, while if it is beyond the lower limit, the resulting composition has insufficient impact resistance.

The polyhydroxy polyolefin used as Component (D) in the invention is a low molecular weight polyolefin having a molecular weight ranging from 1000 to 5000 and hydroxyl groups at the terminals of the molecule. Such polyolefins are, for instance, prepared by hydrogenating polymers obtained through the polymerization of conjugated diene monomers by any known method such as radical polymerization and anion polymerization. It is also possible to use those commercially available such as Polytail-H (trade name; available from Mitsubishi Chemical Industries, Ltd.). The polyhydroxy polyolefins used in the present invention must have a hydroxyl value (KOH mg/g) of not less than 20. This is because, if the hydroxyl value is less than 20, the adhesion to the coating film subsequently applied is impaired.

In the foregoing resin composition, the content of the sum of Components (B) and (C) must be in the range of from 10 to 60% by weight and preferably 20 to 45% by weight on the basis of the total weight of Components (A), (B) and (C). If the content of Components (B) and (C) is less than 10% by weight, the impact resistance and coating properties of the resulting molded article are lowered, while if it exceeds 60% by weight, the rigidity of the article is likewise lowered.

The resin composition must comprise Component (C) in an amount ranging from 1 to 50% by weight and preferably 3 to 40% by weight on the basis of the total weight of Components (B) and (C). This is because if the content of Component (C) is less than 1% by weight, the adhesion of the coated film near gate portions as determined by the X-shaped cross hatch mark test is insufficient. On the other hand, if it exceeds 50% by weight, the coated film has low resistance to solvents.

The foregoing resin composition must comprise Component (D) in an amount ranging from 0.5 to 10% by weight and preferably 1 to 5% by weight on the basis of the total weight of Components (A), (B), (C) and (D). This is because if the content of Component (D) is less than 0.5% by weight, the coating properties (or resistance to solvents) of the resulting molded article are lowered. On the other hand, if it exceeds 10% by weight, the price of the resulting resin composition increases and the coating properties thereof is conversely reduced.

In the present invention, inorganic fillers may be used as Component (E). Specific examples of such inorganic fillers are whiskers of, for instance, calcium oxide, magnesium oxide, aluminum hydroxide, calcium hydroxide, magnesium hydroxide, magnesium carbonate, calcium silicate, magnesium silicate, calcium sulfate, calcium carbonate, barium sulfate, calcium sulfite, talc, clay, glass, mica, basic magnesium carbonate, dolomite, wollastonite, potassium titanate and magnesium sulfate. Among these, calcium carbonate, barium sulfate and talc are particularly preferred from the viewpoint of the balance between impact resistance and rigidity. When the impact resistance of the resulting composition is taken into consideration, the average particle size of the inorganic filler is preferably not more than 5 μm.

In the present invention, the inorganic filler (E) is incorporated into the resin composition in an amount ranging from 0 to 40 parts by weight per 100 parts by weight of the sum of Components (A), (B), (C) and (D) (or 0 to 40% by weight) and preferably 0 to 30% by weight. If the amount of the inorganic filler exceeds 40% by weight, the impact resistance of the resulting resin composition is lowered and in particular the water resistance and resistance to humidity of the resulting molded article coated are reduced (blisters are formed between the resin layer and the coating layer of the molded article) since the inorganic filler in the composition absorbs moisture.

Moreover, the foregoing inorganic filler may be surface-treated. Such surface-treatments can be performed by using, for instance, a variety of coupling agents such as silane and titanate coupling agents; and surface-treating agents such as higher fatty acids and unsaturated organic acids. The use of such inorganic fillers which are subjected to such a surface-treatment is effective for the improvement in the physical properties of the resulting composition such as kneadability, moldability, self-tap strength and weld strength in addition to the foregoing intended effects of the invention.

The resin composition of the present invention further comprises, in addition to the foregoing components (A) to (E), at least one member selected from the group consisting of high-density polyethylene, low-density polyethylene, linear low-density polyethylene, very low-density polyethylene, ethylene-propylene rubber, ethylene-butene rubber, hydrogenated styrene-butadiene rubber and styrene-isoprene rubber in an amount such that they do not adversely influence the intended effects of the present invention.

In addition, the resin composition of the invention may contain, if necessary, additives such as antioxidants, heat stabilizers, UV absorbers, flame retardants, nucleating agents, workability improvers, lubricants, antistatic agents and pigments which have been commonly used in the olefinic polymers.

The polypropylene resin composition of the present invention can be produced by mixing the foregoing components in, for instance, a Henschel mixer commonly employed in the art, then kneading in a single-screw extruder, a double screw extruder, a roll mill or a Banbury mixer and then pelletizing the mixed and kneaded components.

The resin composition thus produced can be molded into desired articles according to any molding method usually used such as injection molding, extrusion molding and compression molding methods.

The coating method of the present invention comprises the steps of molding the foregoing polypropylene resin composition to give a molded article, applying a primer coat to the surface of the molded article or irradiating the article with plasma without applying any pre-treatment with a halogen atom-containing organic solvent, and then applying a top coat onto the article. This coating method may comprise, if necessary, a step for degreasing and washing with an organic solvent other than halogen atom-containing solvents. Examples of the organic solvents other than halogen atom-containing solvents include lower alcohols such as isopropyl alcohol and surfactant-containing alkali or acid aqueous solutions.

The primers for the under coat used in the coating method of the invention include commercially available acryl-chlorinated polypropylene primers for polypropylene. The primer is prepared according to the specifications of the manufacturer and then applied to a molded article in a thickness of, for instance, about 10 μm.

In the coating method of the present invention, it is possible to use various kinds of paints and varnishes such as two-pack urethane paints, one-pack alkyd-melamine paints and one-pack acrylic paint, but particularly preferred are low temperature (for instance, 80° C.) curable urethane paints since the molded article of the composition coated therewith exhibits excellent resistance to gasohol and highly improved adhesion to the coating subsequently applied as determined by the X-shaped cross hatch mark test and thus the effects of the resin composition of the present invention become substantially conspicuous.

The present invention will hereinafter be explained in more detail with reference to the following Examples, but the present invention is by no means limited to these specific Examples.

Each component used in the resin composition will be detailed below.

PP-A: Crystalline ethylene-propylene block copolymer (ethylene content: 8.5% by weight; MI (at 230° C.): 20 g/10 min).

PP-B: Crystalline ethylene-propylene random copolymer (ethylene content: 4.0% by weight; MI (at 230° C.): 15 g/10 min).

EPDM-A: Ethylene-propylene-diene terpolymer rubber having a propylene content of 40% by weight; a Mooney viscosity, $ML_{1+4}$ (100° C.), of 39; an iodine value of 13; a molecular weight distribution, Mw/Mn, of 2.5; and whose diene component is ethylidene norbornene.

EPDM-B: Ethylene-propylene-diene terpolymer rubber having a propylene content of 20% by weight; a Mooney viscosity, $ML_{1+4}$ (100° C.), of 35; an iodine value of 16; a molecular weight distribution, Mw/Mn, of 2.0; and whose diene component is ethylidene norbornene.

EPDM-C: Ethylene-propylene-diene terpolymer rubber having a propylene content of 43% by weight; a Mooney viscosity, $ML_{1+4}$ (100° C.), of 47; an iodine value of 6; a molecular weight distribution, Mw/Mn, of 2.1; and whose diene component is ethylidene norbornene.

EPDM-D: Ethylene-propylene-diene terpolymer rubber having a propylene content of 28% by weight; a Mooney viscosity, $ML_{1+4}$ (100° C.), of 88; an iodine value of 15; a molecular weight distribution, Mw/Mn, of 2.4; and whose diene component is ethylidene norbornene.

EPDM-E: Ethylene-propylene-diene terpolymer rubber having a propylene content of 43% by weight; a Mooney viscosity, $ML_{1+4}$ (100° C.), of 42; an iodine value of 15; a molecular weight distribution, Mw/Mn, of 5.0; and whose diene component is ethylidene norbornene.

EPDM-F: Ethylene-propylene-diene terpolymer rubber having a propylene content of 19% by weight; a Mooney viscosity, $ML_{1+4}$ (100° C.), of 24; an iodine value of 20; a molecular weight distribution, Mw/Mn, of 5.5; and whose diene component is dicyclopentadiene.

EPM-A: Ethylene-propylene copolymer rubber having a propylene content of 22% by weight; and a Mooney viscosity, $ML_{1+4}$ (100° C.), of 19.

EPM-B: Ethylene-propylene copolymer rubber having a propylene content of 26% by weight; and a Mooney viscosity, $ML_{1+4}$ (100° C.), of 24.

EPM-C: Ethylene-propylene copolymer rubber having a propylene content of 50% by weight; and a Mooney viscosity, $ML_{1+4}$ (100° C.), of 27.

Polyhydroxy polyolefin: Polytail-H (trade name; available from Mitsubishi Chemical Industries, Ltd.) having a melt viscosity at 100° C. of 14 poises and a hydroxyl value of 45 mgKOH/mg.

talc: average particle size 2 μm.

EXAMPLES 1 TO 10 AND COMPARATIVE EXAMPLES 1 TO 12

The foregoing components were mixed in amounts listed in the following Tables 1 and 2 in a Henschel mixer, then molten and kneaded in a double-screw extruder whose temperature was set at 210° C. to give a resin composition in the form of pellets.

The bending modulus was determined according to ASTM D790 and the izod impact strength (notched) was determined at temperatures of 23° and −40° C. according to ASTM D256.

Test samples used in the adhesion test of coated film were prepared as follows:

A primer (available from Nippon Bee Chemical Co., Ltd. under the trade name of RB-150) was applied onto a test sample (80×240 mm; thickness 3 mm) obtained through injection molding in a thickness of 10 μm, dried at 80° C. for 40 minutes, followed by the preparation of an urethane paint Metallic (available from Nippon Bee Chemical Co., Ltd. under the trade name of R-212) and an urethane paint Clear (available from Nippon Bee Chemical Co., Ltd. under the trade name of R-213) according to the formulation specified by Nippon Bee Chemical Co., Ltd , application of these paints to the surface of the primer layer in thicknesses of 20 and 3.0 μm respectively, drying at 80° C. for 30 minutes and allowing to stand at room temperature for 48 hours to give a test piece. Cross-shaped cuts were made on the coated film surface of each test piece in intervals of 1 mm to give a cross hatch pattern (10×10=100). Then a cellophane tape was firmly adhered to the cross hatch pattern by the application of manual pressure and rapidly peeled off at an angle of 45°. The rate of remaining cross hatch pattern was determined after repeating twice the foregoing operations (the normal cross hatch mark test). Separately, X-shaped cuts were made on the coated film surface near the gate portion in intervals of 1 mm to give a diagonal cross hatch pattern (10×10=100) and the same test as described above was performed (the X-shaped cross hatch mark test).

The resistance to gasoline and resistance to gasohol were determined by cutting each test sample into pieces of 80×30 mm such that the cross section of each piece was equally exposed, each piece was immersed in gasoline and gasohol (gasoline containing 10% by volume of ethyl alcohol) maintained at 23° C. and the time required till the coated film suffered from abnormality (peeling off, formation of blisters, wrinkles or the like) was determined.

The results obtained are listed in the following Table 1 and 2. The washing treatment with 1,1,1-trichloroethane vapor in Reference Example was performed by exposing each test piece to saturated vapor of 1,1,1-trichloroethane for 30 seconds. Thereafter, the test piece was dried, coated with a primer coat and then subjected to the same procedures as described above.

EXAMPLE 11

The resin composition used in Example 1 was formed into a bumper having a thickness of 4 mm, a length of 1500 mm and a width of 350 mm in an injection molder (clamping pressure: 2500 tons). The bumper was coated in the same manner as used in Example 1 and then subjected to the same test for evaluating the adhesion of the coated film to the molded article as used in Example 1. The bumper exhibited good results. More specifically, the coated film was not peeled off in the cross hatch mark tests, any abnormality was not observed in the tests for resistance to gasoline and gasohol performed over 60 minutes.

As has been described above in detail, the polypropylene resin composition can provide a molded article which has good adhesion to a top coat which is formed on the article simply after application of a primer coat without washing the surface of the article with a halogen atom-containing organic solvent. The resulting coated molded article is excellent in resistance to gasoline and gasohol, has good appearance and thus has high commercial value. The coated molded article can be used, in particular, as external parts for automobiles such as bumpers.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| PP-A | 67 | 67 | 50 | 67 | 68 | | 77 | 67 | 67 | 67 |
| PP-B | | | | | | 57 | | | | |
| EPDM-A | 25.5 | | 40.5 | 25.5 | 24.5 | | 17.5 | 28.5 | 18.5 | 25.5 |
| EPDM-B | | 20.5 | | | | 30 | | | | |
| EPDM-C | | | | | | | | | | |
| EPDM-D | | | | | | | | | | |
| EPDM-E | | | | | | | | | | |
| EPDM-F | | | | | | | | | | |
| EPM-A | 5 | 10 | 7.5 | 5 | 6 | 10 | 3 | 2 | 12 | |
| EPM-B | | | | | | | | | | 5 |
| EPM-C | | | | | | | | | | |
| Polyhydroxy polyolefin | 2.5 | 2.5 | 2.5 | 2.5 | 1.5 | 3 | 2.5 | 2.5 | 2.5 | 2.5 |

TABLE 1-continued

|  | Example 1 | 2 | 3 | 4 | 5 | 6 | 7 | 8 | 9 | 10 |
|---|---|---|---|---|---|---|---|---|---|---|
| Talc | 7 | 7 | — | 20 | 7 | 5 | 5 | 7 | 7 | 7 |
| 1,1,1,-trichloroethane degreasing process | None | None | None | None | None | None | None | None | None | None |
| Bending modulus (Kg/cnf) | 10,300 | 10,500 | 4,900 | 14,500 | 9,800 | 6,100 | 11,500 | 10,000 | 10,700 | 10,000 |
| Izod impact strength (Kg · cm/cm) | | | | | | | | | | |
| 23° C. | Not broken | Not broken | Not broken | Not broken | Not broken | Not broken | Not broken | Not broken | Not broken | Not broken |
| −40° C. | 12.0 | 9.6 | Not broken | 7.0 | 12.2 | 8.5 | 6.0 | 12.2 | 6.8 | 12.2 |
| Cross hatch mark test (% remaining cross hatches) | | | | | | | | | | |
| Normal | 100 | 100 | 100 | 100 | 100 | 100 | 100 | 100 | 100 | 100 |
| X-shaped | 90 | 100 | 100 | 88 | 92 | 100 | 80 | 83 | 100 | 84 |
| Resistance to gasoline (min) | >60 | >60 | >60 | >60 | >60 | >60 | >60 | >60 | >60 | >60 |
| Resistance to gasohol (min) | >60 | >60 | >60 | >60 | >60 | >60 | 55 | >60 | 50 | >60 |
| Appearance of molded article | good | good | good | good | good | good | good | good | good | good |

In any case, the following stabilizers were incorporated:
(a) 2,6-di-t-butyl-4-methylphenol 0.05 parts by weight
(b) calcium stearate 0.1 parts by weight
(c) tetrakis- [methylene-3-(3′,5′-dibutyl-4′-hydroxyphenyl)propionate] methane 0.1 parts by weight
(d) bis-2,2,6,6-tetramethyl-4-piperidibyl sebacate 0.3 parts by weight
In this Table, the amounts of Components (A) to (E) are expressed in terms of "% by weight" on the basis of the total weight of Components (A), (B), (C) and (D).

TABLE 2

|  | Ref. Ex. | Comparative Example 1 | 2 | 3 | 4 | 5 | 6 | 7 | 8 | 9 | 10 | 11 | 12 |
|---|---|---|---|---|---|---|---|---|---|---|---|---|---|
| PP-A | 67 | 67 | 67 | 67 | 67 | 67 | 69 | 67 |  | 90 | 67 | 67 | 67 |
| PP-B |  |  |  |  |  |  |  |  | 55 |  |  |  |  |
| EPDM-A | 25.5 |  |  |  |  |  | 31 | 32.7 |  | 8 | 30.5 | 25.5 | 10 |
| EPDM-B |  |  |  |  |  |  |  |  |  |  |  |  |  |
| EPDM-C |  | 25.5 |  |  |  |  |  |  |  |  |  |  |  |
| EPDM-D |  |  | 25.5 |  |  |  |  |  |  |  |  |  |  |
| EPDM-E |  |  |  | 25.5 |  |  |  |  |  |  |  |  |  |
| EPDM-F |  |  |  |  | 25.5 |  |  |  |  |  |  |  |  |
| EPM-A | 5 | 5 | 5 | 5 | 5 | 30.5 |  |  | 45 |  |  |  | 15.5 |
| EPM-B |  |  |  |  |  |  |  |  |  |  |  |  |  |
| EPM-C |  |  |  |  |  |  |  |  |  | 5 |  |  |  |
| Polyhydroxy polyolefin | 2.5 | 2.5 | 2.5 | 2.5 | 2.5 | 2.5 | — | 0.3 | 3 | 2 | 2.5 | 2.5 | 2.5 |
| Talc | 7 | 7 | 7 | 7 | 7 | 7 | 7 | 7 | 5 | — | 7 | 7 | 7 |
| 1,1,1,-trichloroethane degreasing process | None | None | None | None | None | None | None | None | None | None | None | None | None |
| Bending modulus (Kg/cnf) | 10,300 | 10,700 | 10,700 | 10,500 | 10,800 | 11,000 | 10,500 | 10,400 | 5,800 | 13,000 | 10,000 | 9,600 | 10,700 |
| Izod impact strength (Kg · cm/cm) | | | | | | | | | | | | | |
| 23° C. | Not broken | Not broken | Not broken | Not broken | Not broken | Not broken | Not broken | Not broken | 13.0 | Not broken | Not broken | Not broken | Not broken |
| −40° C. | 12.0 | 11.8 | 12.2 | 12.4 | 9.1 | 4.5 | 12.1 | 13.5 | 11.8 | 4.0 | 12.1 | 12.5 | 6.2. |
| Lattice pattern cutting test (% remaining cross hatches) | | | | | | | | | | | | | |
| Normal | 100 | 100 | 0 | 100 | 100 | 100 | 100 | 100 | 100 | 65 | 100 | 100 | 100 |
| X-shaped | 100 | 78 | 0 | 88 | 92 | 100 | 55 | 60 | 100 | 22 | 58 | 60 | 100 |
| Resistance to gasoline (min) | >60 | 50 | 10 | 55 | >60 | 30 | >60 | >60 | 35 | 12 | >60 | >60 | >60 |
| Resistance to gasohol (min) | >60 | 15 | 2 | 25 | 50 | 10 | 20 | 23 | 12 | 3 | >60 | >60 | 38 |
| Appearance of molded article | good | good | bad | bad | bad | good | good | good | good | good | good | good | good |

In any case, the following stabilizers were incorporated:
(a) 2,6-di-t-butyl-4-methylphenol 0.05 parts by weight
(b) calcium stearate 0.1 parts by weight
(c) tetrakis- [methylene-3-(3′,5′-dibutyl-4′-hydroxyphenyl)propionate] methane 0.1 parts by weight
(d) bis-2,2,6,6-tetramethyl-4-piperidibyl sebacate 0.3 parts by weight
In this Table, the amounts of Components (A) to (E) are expressed in terms of "% by weight" on the basis of the total weight of Components (A), (B), (C) and (D).

We claim:

1. A polypropylene resin composition comprising (A) a polypropylene; (B) an ethylene-propylene-diene terpolymer rubber having a propylene content ranging from 15 to 50% by weight, a Mooney viscosity $ML_{1+4}$ (100° C.) ranging from 20 to 60, an iodine value ranging from 8 to 25 and a molecular weight distribution, Mw/Mn, ranging from 1.5 to 4.0; (C) an ethylene-propylene copolymer rubber having a propylene content ranging from 15 to 35% by weight and a Mooney viscosity $ML_{1+4}$ (100° C.) ranging from 15 to 25; (D) a polyhydroxy polyolefin having a hydroxyl value (KOH mg/g) of not less than 20; and (E) an inorganic filler, the amounts of these components satisfying the following relations (1) to (4):

$$10 \leq [(B)+(C)]/[(A)+(B)+(C)] \leq 60 \ (\% \ \text{by weight}) \quad (1)$$

$$1 \leq (C)/[(B)+(C)] \leq 50 \ (\% \ \text{by weight}) \quad (2)$$

$$0.5 \leq (D)/[(A)+(B)+(C)+(D)] \leq 10 \ (\% \ \text{by weight}) \quad (3)$$

$$0 \leq (E)/[(A)+(B)+(C)+(D)] \leq 40 \ (\% \ \text{by weight}) \quad (4).$$

2. The resin composition of claim 1 wherein in the foregoing value $[(B)+(C)]/[(A)+(B)+(C)]$ in the relation (1) ranges from 20 to 45% by weight.

3. The resin composition of claim 1 wherein the foregoing value $(C)/[(B)+(C)]$ in the relation (2) ranges from 3 to 40% by weight.

4. A coating method comprising the steps of molding a polypropylene resin composition as set forth in claim 1 to give a molded article, applying a primer coat to the surface of the molded article or irradiating the surface thereof with plasma without applying any pre-treatment with a halogen atom-containing organic solvent, and then applying a top coat onto the article.

5. A coated molded article obtained by molding an article from the foregoing polypropylene resin composition and then coating the molded article according to the coating method as set forth in claim 4.

6. The coated molded article of claim 5 wherein the molded article is an external part for automobile.

* * * * *